(12) United States Patent
Edelson et al.

(10) Patent No.: US 9,475,574 B2
(45) Date of Patent: Oct. 25, 2016

(54) HEAT DISSIPATION SYSTEM FOR AIRCRAFT DRIVE WHEEL DRIVE ASSEMBLY

(75) Inventors: Jonathan Sidney Edelson, Portland, OR (US); Rodney T. Cox, North Plains, OR (US); Nechama Cox, Baltimore, MD (US); Isaiah W. Cox, Baltimore, MD (US)

(73) Assignee: Borealis Technical Limited, Gibraltar (GI)

( * ) Notice: Subject to any disclaimer, the term of this patent is extended or adjusted under 35 U.S.C. 154(b) by 322 days.

(21) Appl. No.: 13/615,930

(22) Filed: Sep. 14, 2012

(65) Prior Publication Data

US 2015/0159968 A1 Jun. 11, 2015

Related U.S. Application Data

(60) Provisional application No. 61/534,713, filed on Sep. 14, 2011.

(51) Int. Cl.
| | |
|---|---|
| *B64C 25/40* | (2006.01) |
| *H02K 9/19* | (2006.01) |
| *H02K 7/14* | (2006.01) |
| *B60K 7/00* | (2006.01) |
| *B60K 1/00* | (2006.01) |
| *B60K 11/02* | (2006.01) |

(52) U.S. Cl.
CPC ........... *B64C 25/405* (2013.01); *B60K 7/0007* (2013.01); *H02K 7/14* (2013.01); *H02K 9/19* (2013.01); *B60K 11/02* (2013.01); *B60K 2001/006* (2013.01); *B60K 2007/0038* (2013.01); *B60K 2007/0092* (2013.01); *B60Y 2200/50* (2013.01); *B60Y 2200/51* (2013.01); *B60Y 2306/03* (2013.01); *Y02T 50/823* (2013.01)

(58) Field of Classification Search
CPC ... B64C 25/00; B64C 25/405; B64C 25/001; B64C 25/34; B64C 25/36; B60K 7/0007; B60B 19/08
See application file for complete search history.

(56) References Cited

U.S. PATENT DOCUMENTS

| | | | | |
|---|---|---|---|---|
| 2,408,163 | A * | 9/1946 | Fodor | B64C 25/40 244/103 S |
| 2,425,583 | A * | 8/1947 | Volk | B64C 25/40 244/103 S |
| 2,506,146 | A * | 5/1950 | Gladish | B60K 7/0007 310/67 R |
| 3,059,712 | A * | 10/1962 | Hautau | B64C 25/405 180/10 |
| 3,301,357 | A * | 1/1967 | Cussons | B60B 19/10 188/264 AA |
| 3,482,806 | A * | 12/1969 | Trautzsch | B64C 25/405 244/103 R |

(Continued)

*Primary Examiner* — Tien Dinh
*Assistant Examiner* — Michael A Fabula

(57) ABSTRACT

A system is provided for dissipating heat in an onboard non-engine powered aircraft wheel drive assembly with drive means that power one or more aircraft wheels to drive the aircraft autonomously on the ground without directly using the aircraft engines. The heat dissipation system is integral with a wheel drive assembly mounted substantially completely within a nose or main landing gear wheel. A reservoir mounted outboard or inboard of the wheel drive assembly increases thermal distribution mass and fluidically communicates with wheel drive assembly components to automatically circulate heat transfer fluid between the wheel drive assembly and the reservoir when the operating temperature exceeds a predetermined maximum temperature during aircraft ground travel. The heat dissipating system can be retrofitted in an existing aircraft to improve thermal distribution and prolong wheel drive assembly and drive means operation and useful life.

14 Claims, 2 Drawing Sheets

(56) References Cited

U.S. PATENT DOCUMENTS

| | | | | |
|---|---|---|---|---|
| 3,770,074 A | * | 11/1973 | Sherman | B60K 7/0007 180/339 |
| 3,812,928 A | * | 5/1974 | Rockwell | B60K 7/0007 105/55 |
| 3,952,846 A | * | 4/1976 | Han | F16D 55/40 165/86 |
| 3,977,631 A | | 8/1976 | Jenny | |
| 4,802,560 A | * | 2/1989 | Bhadra | B60T 1/06 188/164 |
| 5,111,090 A | * | 5/1992 | Otake | H02K 9/19 180/229 |
| 5,127,485 A | * | 7/1992 | Wakuta | B60K 7/0007 180/65.51 |
| 5,633,544 A | * | 5/1997 | Toida | B60K 7/0007 180/65.1 |
| 5,679,087 A | * | 10/1997 | Lutz | B60K 1/02 475/149 |
| 6,657,334 B1 | * | 12/2003 | Edelson | H02K 3/28 310/166 |
| 6,833,641 B2 | | 12/2004 | Uchida et al. | |
| 6,838,791 B2 | | 1/2005 | Edelson | |
| 7,009,317 B2 | * | 3/2006 | Cronin | H02K 9/19 310/52 |
| 7,116,019 B2 | | 10/2006 | Edelson | |
| 7,226,018 B2 | | 6/2007 | Sullivan | |
| 7,445,178 B2 | * | 11/2008 | McCoskey | B64F 1/32 244/100 R |
| 7,469,858 B2 | | 12/2008 | Edelson | |
| 7,828,095 B2 | * | 11/2010 | Murata | B60K 7/0007 180/65.1 |
| 7,938,212 B2 | * | 5/2011 | Sakuma | B60K 7/0007 180/65.51 |
| 7,975,960 B2 | * | 7/2011 | Cox | B64C 25/36 244/103 R |
| 8,136,761 B2 | * | 3/2012 | Kiyosawa | B64C 25/405 244/103 R |
| 8,316,973 B2 | * | 11/2012 | Walter | B60K 7/0007 180/65.51 |
| 8,485,466 B2 | * | 7/2013 | Charles | B64C 25/405 244/103 R |
| 2005/0061565 A1 | * | 3/2005 | Mizutani | B60K 7/0007 180/65.51 |
| 2005/0206250 A1 | * | 9/2005 | Steffen | B60K 7/0007 310/59 |
| 2006/0273686 A1 | | 12/2006 | Edelson et al. | |
| 2007/0199339 A1 | * | 8/2007 | Ishihara | B60K 1/02 62/242 |
| 2007/0282491 A1 | | 12/2007 | Cox et al. | |
| 2007/0284478 A1 | * | 12/2007 | Soderberg | B64C 25/36 244/103 R |
| 2007/0284939 A1 | * | 12/2007 | Charles | B60T 1/10 303/152 |
| 2008/0035399 A1 | * | 2/2008 | Murata | B60K 7/0007 180/65.51 |
| 2008/0035407 A1 | * | 2/2008 | Murata | B60K 7/0015 180/308 |
| 2008/0036284 A1 | * | 2/2008 | Murata | B60K 7/0007 301/6.5 |
| 2008/0067882 A1 | * | 3/2008 | Murata | H02K 9/19 310/54 |
| 2008/0083572 A1 | * | 4/2008 | Ishida | B60K 7/0007 180/55 |
| 2009/0152055 A1 | | 6/2009 | Cox | |
| 2009/0195093 A1 | | 8/2009 | Bandai et al. | |
| 2009/0236158 A1 | * | 9/2009 | Sakuma | B60K 7/0007 180/65.51 |
| 2009/0294577 A1 | * | 12/2009 | Roques | B64C 25/40 244/50 |
| 2010/0065678 A1 | * | 3/2010 | Kiyosawa | B64C 25/405 244/50 |
| 2010/0187897 A1 | * | 7/2010 | Caule | B64C 25/36 301/6.3 |
| 2010/0288873 A1 | * | 11/2010 | Cox | B64C 25/405 244/50 |
| 2011/0089289 A1 | * | 4/2011 | Wilson | B64C 25/405 244/50 |
| 2011/0156472 A1 | * | 6/2011 | Bucheton | B64C 25/405 301/6.2 |
| 2011/0284685 A1 | * | 11/2011 | Gilleran | B64C 25/405 244/50 |
| 2011/0297786 A1 | * | 12/2011 | Sweet | B64C 25/405 244/103 R |
| 2011/0304292 A1 | * | 12/2011 | Charuel | B64C 25/405 318/450 |
| 2012/0001018 A1 | * | 1/2012 | Gilleran | B64C 25/405 244/50 |
| 2012/0104158 A1 | * | 5/2012 | Charles | B64C 25/405 244/50 |
| 2012/0138735 A1 | * | 6/2012 | Nierlich | B64C 25/405 244/50 |
| 2012/0153753 A1 | * | 6/2012 | Hanlon | F16D 65/14 310/77 |
| 2013/0056580 A1 | * | 3/2013 | Gilleran | B64C 25/405 244/50 |
| 2013/0062466 A1 | * | 3/2013 | Sweet | B64C 25/405 244/103 R |
| 2013/0112805 A1 | * | 5/2013 | Cox | B64C 25/36 244/50 |
| 2014/0225421 A1 | * | 8/2014 | Oswald | B64C 25/405 301/6.2 |
| 2015/0097078 A1 | * | 4/2015 | Mueller | B64C 25/405 244/50 |
| 2015/0151833 A1 | * | 6/2015 | Cox | H02K 9/22 301/6.2 |

* cited by examiner

HEAT DISSIPATION SYSTEM FOR AIRCRAFT DRIVE WHEEL DRIVE ASSEMBLY

PRIORITY CLAIM

This application claims priority from U.S. Provisional Patent Application No. 61/534,713, filed 14 Sep. 2011, the disclosure of which is fully incorporated herein.

TECHNICAL FIELD

The present invention relates generally to heat dissipation in aircraft drive wheels and, specifically, to a system for effectively dissipating heat in an aircraft drive wheel drive assembly designed to drive an aircraft wheel autonomously during aircraft ground travel.

BACKGROUND OF THE INVENTION

As air travel has increased over the past decades, airport facilities have become more crowded and congested. Minimizing the time between the arrival of an aircraft and its departure to maintain an airline's flight schedule, and also to make a gate or parking location available without delay to an incoming aircraft, has become an airline priority. The safe and efficient ground movement of a large number of aircraft simultaneously into and out of the ramp and gate areas has become increasingly important. As airline fuel costs and safety concerns and regulations have increased, use of the aircraft main engines is no longer the best option for achieving the desired safe and efficient ground movement.

One of the various alternatives to the use of an aircraft's main engines to move an aircraft on the ground that has been proposed is the use of a motor structure integrally mounted with a wheel to rotate the wheel and drive the aircraft. The use of such a structure should move an aircraft during ground travel without using of an aircraft's main engines. U.S. Pat. No. 3,977,631 to Jenny describes a drive motor associated with aircraft gear wheels intended to drive an aircraft on the ground. In U.S. Pat. No. 7,445,178, McCoskey et al describe a powered nose aircraft wheel system with a multifunctional wheel motor coupled to the wheel axle and the wheel and located within the hub of the wheel. U.S. Pat. No. 7,226,018 to Sullivan additionally describes a wheel motor useful in an aircraft landing gear wheel designed to provide motive force to an aircraft wheel when electric power is applied. None of the foregoing patents, however, provides structure or method for dissipating heat or thermal distribution in the motors described therein.

U.S. Pat. No. 7,469,858 to Edelson, owned in common with the present invention, describes a geared wheel motor design that may be used to move an aircraft from a stationary position for taxiing. Published United States patent applications, including U.S. Patent Application Publication Nos. US2006/0273686 to Edelson, US2007/0282491 to Cox et al, and U.S. Pat. No. 7,975,960 to Cox, also owned in common with the present invention, describe aircraft drive systems that use electric drive motors to power aircraft wheels and move an aircraft on the ground. None of these patents or publications suggests a system for dissipating heat or enhancing thermal distribution in the disclosed electric motors. Commonly owned U.S. Patent Application Publication No. US2009/0152055 to Cox describes the cooling of brakes and other components in an aircraft undercarriage wheel with a drive means to propel the aircraft on the ground, wherein the drive means acts like a fan to provide air for cooling. There is no suggestion, however, of providing specific heat dissipation or thermal distribution structure for the drive means.

Cooling apparatus has been proposed for other kinds of vehicle electric drive motors. In U.S. Pat. No. 5,127,485, for example, Wakuta et al describe a cooling system for a compact, high torque wheel motor of the type used in golf carts and forklifts that has an oil reservoir in the lower part of the motor casing and requires an oil pump with a separate motor and a control circuit to direct oil flow that cools and lubricates the motor. Cooling fins are also provided to keep the motor at an acceptable temperature. It is not suggested that the oil reservoir of this system dissipates heat or that the system could function without the oil pump. U.S. Pat. No. 6,833,641 to Uchida et al and U.S. Patent Application Publication No. US2009/0195093 to Bandai et al both disclose the use of oil as a cooling fluid in electric drive motors. Uchida et al describes one oil reservoir in an upper area of the motor casing in communication with a second oil supply reservoir. It is not suggested that either reservoir dissipates heat or that this system would function effectively without both of these reservoirs. Bandai et al describes a single oil reservoir that provides oil to the motor in a storage chamber, wherein the bottom of the storage chamber functions as an oil pan so that rotation of the motor splashes it with oil. An electric motor radiator is also provided in this arrangement. Bandai et al does not suggest that the electric motor radiator could be eliminated. None of the foregoing art, moreover, suggests that the disclosed motor cooling arrangements could effectively dissipate heat and enhance thermal distribution during operation of an onboard non-engine powered electric drive assembly capable of powering one or more aircraft wheels to drive an aircraft on the ground.

A need exists, therefore, for a system to dissipate heat and enhance thermal distribution in an onboard non-engine powered drive assembly with a drive means that powers one or more aircraft wheels to drive the aircraft on the ground without directly using the aircraft engines. A need additionally exists for a drive means heat dissipation system that can be integrated with the aforementioned onboard non-engine powered drive means assembly drive means without changes to the existing aircraft landing gear components.

SUMMARY OF THE INVENTION

It is a primary object of the present invention, therefore, to provide a system for dissipating heat and enhancing thermal distribution in an onboard non-engine powered drive assembly drive means that powers one or more aircraft wheels to drive the aircraft on the ground without directly using the aircraft engines.

It is another object of the present invention to provide a system for dissipating heat in an onboard non-engine powered wheel drive assembly drivingly associated with one or more aircraft wheels that includes a heat-dissipating reservoir in thermal contact and fluid communication with the wheel drive assembly components that effectively dissipates heat from a drive means and enhances thermal distribution in the wheel drive assembly.

It is an additional object of the present invention to provide a heat dissipation system for an aircraft wheel drive assembly with an electric drive means that improves thermal distribution and smoothes out drive means hot spots, thereby increasing the operating time and effective useful life of the electric drive means.

It is an additional object of the present invention to provide a system for dissipating heat in an onboard non-engine powered wheel drive assembly drivingly associated with one or more aircraft wheels that includes a heat-dissipating reservoir in fluid communication with a wheel drive assembly drive means that simultaneously dissipates heat from and lubricates drive means moving components.

It is a further object of the present invention to provide a system for dissipating heat in an aircraft onboard non-engine powered electric wheel drive assembly that is configured to fit integrally within an aircraft nose wheel or main wheel landing gear.

It is yet a further object of the present invention to provide a system for dissipating heat that operates intelligently during the operation of an aircraft onboard non-engine powered electric wheel drive assembly to move an aircraft during ground travel that automatically dissipates heat and enhances thermal distribution to maintain the wheel drive assembly at an optimum operating temperature.

It is yet another object of the present invention to provide a system for dissipating heat and enhancing thermal distribution in an onboard non-engine powered electric wheel drive assembly drivingly associated with one or more aircraft wheels that can be retrofitted in an existing aircraft.

It is yet an additional object of the present invention to provide a method for enhancing thermal distribution and dissipating heat in an aircraft wheel drive assembly drive means to increase drive means operating time and extend the useful life of the drive means.

In accordance with the aforesaid objects, a system for dissipating heat in an aircraft onboard non-engine powered wheel drive assembly that powers one or more aircraft wheels to drive the aircraft on the ground without directly using the aircraft engine is provided. The heat dissipating system is configured to fit integrally with a wheel drive assembly mounted on an aircraft nose or main landing gear wheel axle substantially completely within the dimensions of an aircraft nose or main wheel landing gear. The wheel drive assembly includes a drive means, preferably an electric drive means with rotor and stator elements, a gear assembly, and a clutch assembly. A heat dissipating reservoir mounted on or near the wheel drive assembly in thermal contact with the wheel drive assembly directs heat dissipating fluid to the drive means components during operation while providing additional mass to the wheel drive assembly to enhance thermal distribution. Heat dissipating fluid, preferably oil or a similar fluid capable of efficient heat transfer, is automatically circulated from the reservoir to the drive means components to transfer heat between the drive means and the reservoir when sensed data indicates that the temperature of the drive means components exceeds a desired maximum level. Heat is effectively dissipated from the drive means components to the reservoir, enabling the drive means to continue operating for a longer period. The drive assembly components may be simultaneously lubricated by the heat transfer fluid while heat is transferred from the drive means components to the reservoir and other thermal distribution structures. The heat dissipation system of the present invention can be retrofitted in an existing aircraft to improve thermal distribution and prolong drive means operation and useful life in aircraft wheel drives with onboard drive means means.

Other objects and advantages will be apparent from the following description, drawings, and claims.

DESCRIPTION OF THE INVENTION

Figure 1:
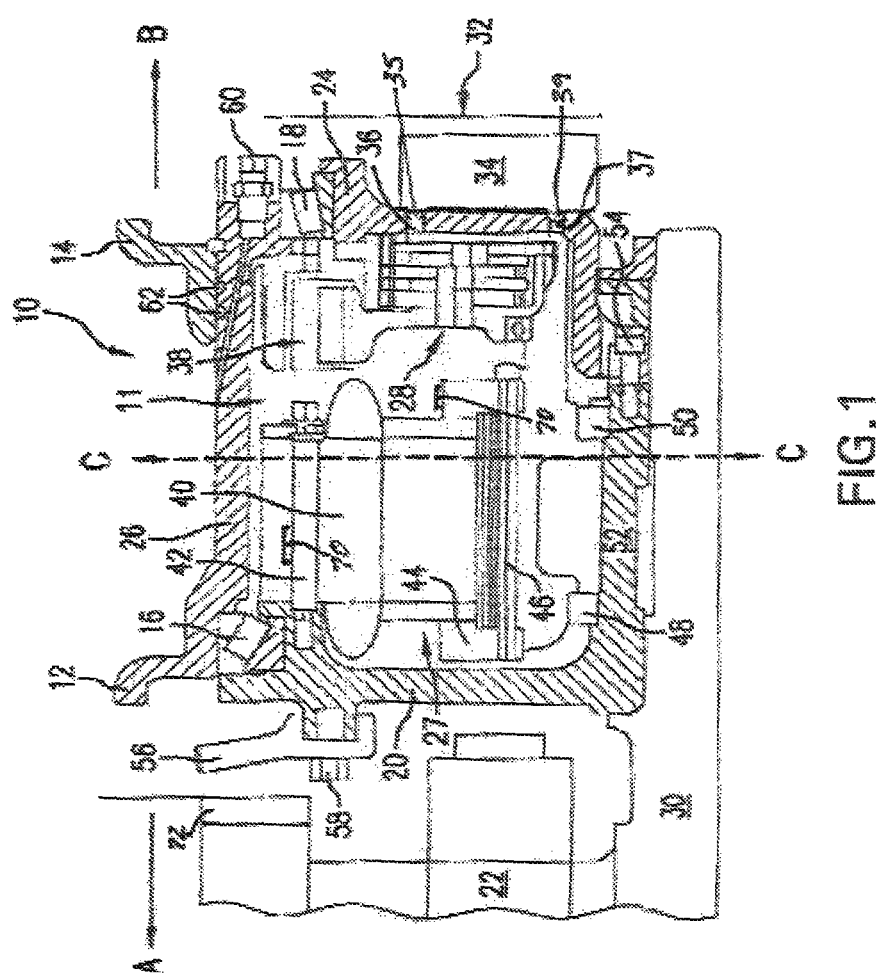
FIG. 1 is a diagrammatic illustration of a heat dissipation and thermal distribution system in a wheel drive assembly integrated substantially completely within an aircraft landing gear wheel well with heat dissipating and thermal distribution structure mounted in an outboard location in accordance with the present invention.

The many advantages of being able to drive an aircraft on the ground independently without using the aircraft main engines have been acknowledged. One of the challenges presented by the onboard non-engine powered wheel drive assemblies that have been proposed for use in moving aircraft during ground travel is providing adequate dissipation of the heat that builds up in the electric drive means used in these drive assemblies during operation. Moving a commercial sized aircraft on the ground with a drive assembly generates heat during operation of the drive assembly drive means, which builds up in the drive assembly. This heat must be directed away from the drive means and other drive assembly components if they are to continue to operate effectively. Effective thermal distribution during operation of a drive assembly prolongs both operating time and drive means useful life.

The heat to be dissipated is produced as the drive means operates to move the aircraft's wheels and move the aircraft. When the drive means is an electric motor, the current required to power the electric motor heats the motor coil. Additionally, rotation of a rotor at the high speed required for a drive assembly to move an aircraft generates heat. High loads also lead to heat generation in an electric or other drive motor. It has been suggested that heat is generated in an electric motor by copper loss attributed to coil resistance or iron loss attributed to AC magnetic flux passing the coil. Whatever the cause of heat production, an overheated drive motor will eventually cease functioning. When loads are high, heat dissipation from a drive motor is required to counter heat generation to keep the motor in operation.

Not only are drive means elements damaged by excessive heat, but other associated drive assembly structures, such as, for example, gears, clutch structures, and bearings, can be degraded so that their strength and reliability are impaired. To ensure proper functioning of the drive means elements and other aircraft wheel drive assembly components, therefore, the effective dissipation of heat from these components is essential. Maintaining proper lubrication of moving components in an aircraft wheel drive assembly, moreover, will further help to minimize or prevent heat generation and build up.

The typical location of an aircraft drive assembly, in driving relationship to one or more aircraft nose wheels or main wheels, does not provide a significant amount of space for heat dissipation or thermal distribution apparatus. In one type of wheel drive assembly arrangement, the drive assembly is mounted substantially completely within the volume provided in an aircraft wheel. The wheel can be a nose landing gear wheel or a main landing gear wheel. Since landing gears on existing aircraft are already completely designed to function without additional components like wheel drive assemblies, there is not much space available for a drive means or motor, a gear assembly, a clutch, if required, electrical connections, or heat dissipation structures. Modifications that require changes to the landing gear axle or piston can be expensive and time consuming, in large part because any changes from existing structure would require re-certification by regulatory authorities such as the United States Federal Aviation Administration (FAA) and equivalent international regulatory authorities.

FIG. 1 illustrates diagrammatically an aircraft wheel 10 with a wheel drive assembly 11 including a heat dissipation system according to the present invention. In FIG. 1, the arrows A and B indicate, respectively, the inboard and outboard orientation of the aircraft wheel with respect to an aircraft nose or main landing gear. The configuration of the aircraft wheel 10 of FIG. 1 maximizes the internal wheel volume to provide maximum space for integrating a wheel drive assembly 11 to fit substantially completely within the space provided. Space for heat dissipation structure, while limited, is available in this aircraft wheel configuration.

The wheel 10 supports a tire (not shown in FIG. 1) on tire flanges 12 and 14 and is connected through bearings 16 and 18 to other wheel structures as described below. A wheel wall or side plate 20 is the inboard, or inside, support wall for the wheel. Unlike in a conventional wheel, the support wall 20 does not rotate. The shape and location of wall 20 are selected so that this structure is located as close as possible to a landing gear piston 22. A pass-through for wiring (not shown), preferably in the form of a wiring harness, is provided in wheel wall 20. This wiring optimally provides a single connector through the wheel configured to serve all of the electric functions and wiring for the wheel drive assembly 11 when, as discussed below, the drive assembly includes a drive means that is an electric motor. An outboard, or outside, wheel wall or side plate 24 is located opposite the inboard wall 20. The wheel drive assembly 11 is enclosed completely within the boundaries formed by the respective inboard and outboard side walls 20 and 24 and an upper wheel section 26 that supports the tire flanges 12 and 14. While the wheel walls 20, 24, and 26 and other wheel components are preferably formed of steel, other materials that are suitable for use in this environment could also be used for this purpose.

Maximum space is provided in the wheel drive assembly 11 to include the structures of a drive means assembly or motor 27 and a gear assembly 28 by locating the inboard and outboard wheel walls 20 and 24 as far away from the midpoint, represented by the line C-C, of the wheel and the axle 30 as possible. The outboard wall 24 must be positioned to avoid coming into contact with the narrowest part of the wheel well or landing gear doors, which is represented by the vertical boundary line 32. The outboard wall 24 may belocated a selected distance inboard of the wheel well boundary line 32, as shown, or further outboard, if required, to accommodate the location of components of the heat dissipation system of the present invention, as described below.

The heat dissipation system of the present invention is designed to effectively dissipate heat and enhance thermaldistribution during operation of an electric or other drivemeans, as well as other components of the wheel drive assembly 11. When oil or a similar fluid is used as a heat dissipating or thermal transfer fluid in accordance with the presentinvention, the wheel drive assembly components are simultaneously cooled and lubricated. Oil's comparatively high thermal conductivity tends to transfer heat relatively rapidly away from aircraft wheel assembly structures, such as the drive means assembly 27 and gear assembly 28 of the present invention. Air has a lower thermal conductivity and is not nearly aseffective in dissipating heat as oil. Another advantage of using oil as a heat dissipating or thermal transfer fluid for the motor and other components of an aircraft drive wheel assembly compared to air is the tendency of an oil-cooled motor to operate at a lower temperature than an air-cooled motor. Other suitable heat dissipating or thermal transfer fluids in addition to oil could also be used and are contemplated to be within the scope of the present invention.

An essential component of the heat dissipation system of the present invention is a fluid reservoir 34, shown mounted on the outboard wheel wall 24 in FIG. 1, preferably in thermal contact with the wall 24. One or more heat transfer fluid passages or channels, such as upper channel 36 and lower channel 37, can be provided to connect the fluid reservoir 34 with theinterior of the wheel to provide heat transfer fluid to the drive means assembly 27 and gear assembly 28 components, as well as to a clutch 38, during operation of the wheel drive assembly 11. When the reservoir 34 is made of a suitable metal, the reservoir can increase the thermal mass of the drive assembly 11 components, which improves thermal distribution and assists heat movement out of the drive means assembly 27. The combination of this additional thermal mass with the excellent heat transfer characteristics of oil can provide superior thermal distribution during operation of the wheel drive assembly 11 to move an aircraft on the ground. Areas of higher heat or "hot spots" in the drive means assembly 27 can be smoothed out so heat is distributed more uniformly from the drive means assembly, which can prolong drive means operating time. The useful life of the drive means assembly 27 can also be extended by the improved thermal distribution provided by the additional thermal mass of the reservoir 34.

The size of the drive means assembly 27 and, thus, the mass available for thermal distribution in an aircraft wheel drive assembly 11 is generally limited by the possible locations forthe drive means on or in an aircraft. The electric drive means preferred for use in the present invention must be capable of generating high torque across the desired speed range, as discussed below, to move an aircraft independently on the ground without the direct use of the aircraft's main engines. The addition of structure, such as an oil reservoir in accordance with the present invention that increases the mass available for heat transfer and thermal distribution extends drive means effective operating time as well as its useful life.

Figure 2:
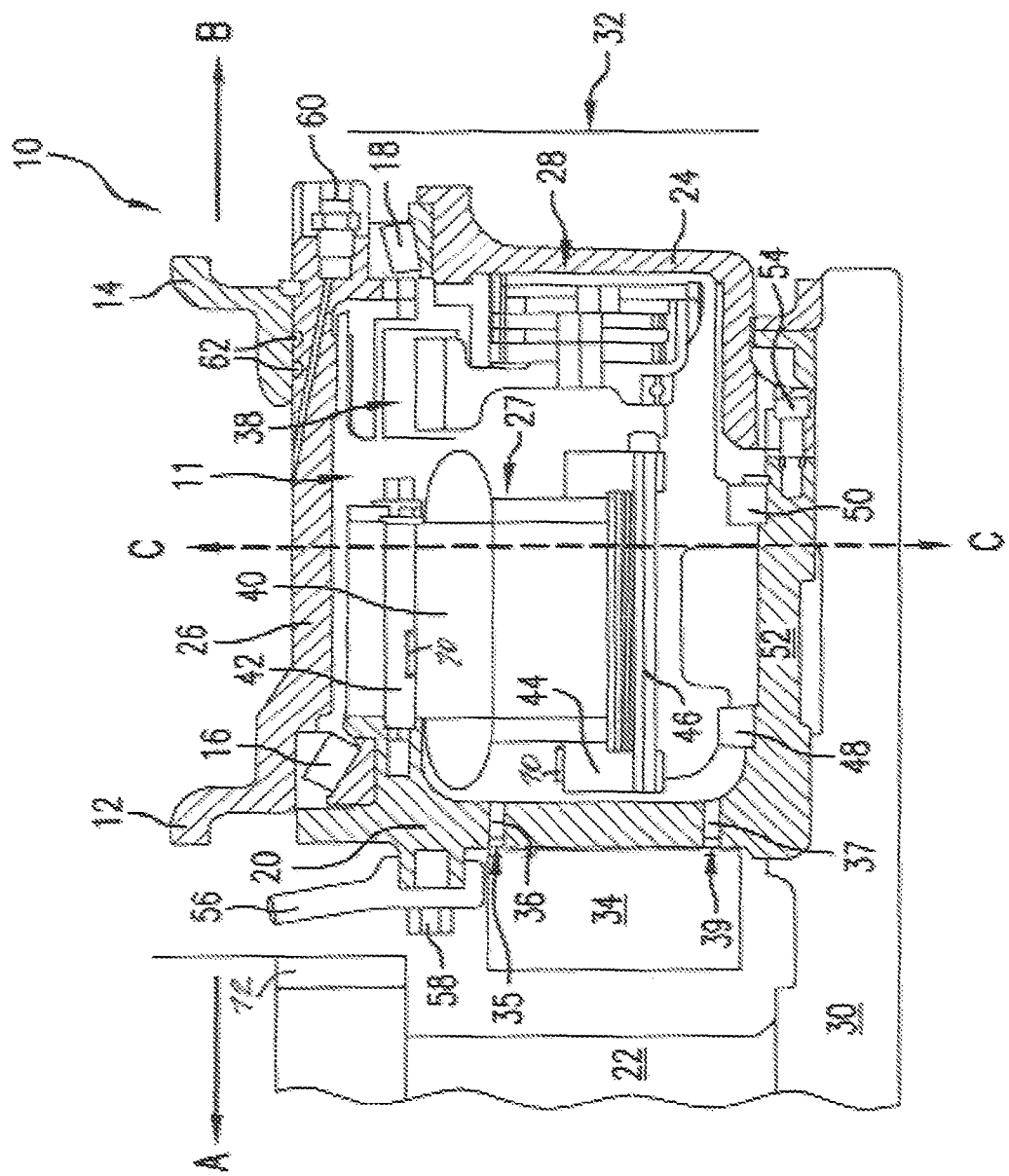
FIG. 2 is a diagrammatic illustration of the heat dissipation and thermal distribution system of FIG. 1 with heat dissipating and thermal distribution structure mounted in an inboard location.

Alternatively, as shown in FIG. 2, a fluid reservoir 34 could be mounted on or near the inboard wheel wall 20. As in FIG. 1, one or more fluid passages, such as upper channel 36 and lower channel 37, provide fluid communication between the reservoir 34 and the gear assembly 28, the drive means assembly 27, and other wheel drive assembly components. Other numbers and locations of fluid passages different from those shown in FIGS. 1 and 2 could also be effectively used and are intended to be included within the scope of present invention.

The fluid reservoir 34 must be sized to increase drive means heat dissipation and enhance thermal distribution and, additionally, to fit within either the outboard location shownon FIG. 1 or the inboard location shown in FIG. 2. The fluid reservoir could be designed to be refillable orreplaceable. The outboard fluid reservoir location of FIG. 1 is more easily accessed than the inboard fluid reservoir location of FIG. 2 and is likely to be preferred for many applications. However, because the wheel drive assembly 11 is configured to be easily removed, the inboard fluid reservoir location closer to the drive means assembly 27 moving components may be preferred in other applications.

The drive means assembly 27 of FIG. 1 is preferably an electric drive means and includes a stator 40, preferably mounted by a precision fitted flanged tube 42 to ensure the alignment of the stator stack. Multiple bolts, screws, or other suitable fasteners (not shown) are preferably provided to hold the statorto the wheel inboard wall 20. A rotor 44 is shown mounted on a splined shaft 46. Bolts (not shown) are preferably provided to squeeze the rotor stack together. While this arrangement of rotor and stator components is preferred, other rotor and stator designs that are configured to fit within the wheel well volumecould also be used effectively and are contemplated to be within the scope of the present invention.

The wheel drive assembly 11 and, therefore, the drive means assembly 27 and other drive assembly components, preferably rest on and are supported by a landing gear wheel axle 30, as shown. Other arrangements whereby a drive assembly may be supported within a landing gear wheel relative to an axle may also be employed.

It is preferred that the drive means assembly 27 be an enclosed machine capable of operating for about 5 to 10 minutes atmaximum torque and for 30 to 40 minutes at cruise torque, using the motor itself as a heat sink in combination with the heat dissipating and thermal transfer system described herein. An electric motor is preferred as the drive means of the wheel drive assembly of the present invention and could be any one of a number of electric motor designs, for example an inside-out motor attached to a wheel hub in which the rotor can be internal to or external to the stator, such as that shown and described in U.S. Patent Application Publication No. 2006/0273686, the disclosure of which is incorporated herein by reference. A toroidally-wound motor, an axial flux motor, or any other electric motor geometry known in the art is also contemplated to be suitable for use in the present invention.

The electric or other motor selected should be able to move an aircraft landing gear wheel at a desired speed and torque. One kind of electric drive motor preferred for this purpose is a high phase order electric motor of the kind described in, for example, U.S. Pat. Nos. 6,657,334; 6,838,791; 7,116,019; and 7,469,858, all of which are owned in common with the present invention. A geared motor, such as that shown and described in U.S. Pat. No. 7,469,858, is designed to produce the torque required to move a commercial sized aircraft at an optimum speed for ground movement. The disclosures of the aforementioned patents are incorporated herein by reference. Any form of electric motor capable of driving a gear wheel to move an aircraft on the ground, including but not limited to electric induction motors, permanent magnet brushless DC motors, and switched reluctance motors may also be used. Other motor designs, including hydraulic pump/motor assemblies and pneumatic motors, capable of high torque operation across the desired speed range that can be integrated into an aircraft wheel to function as described herein may also be suitable for use as a drive means in the present invention. A particularly preferred motor is a high phase order induction motor with a top tangential speed of about 15,000 linear feet per minute and a maximum rotor speed of about 7200 rpm. With an effective wheel diameter of about 27 inches and an appropriate gear ratio, an optimum top speed of about 28 miles per hour (mph) can be achieved.

The drive means assembly 27 is preferably drivingly connected to a gear assembly 28. While the preferred gear assembly 28 is a system of planetary gears as shown, any other type of gear system that can function for the desired purpose could also be employed. One preferred arrangement employs at least four high strength steel planetary gears at each stage to achieve a gear ratio of approximately 20:1. Other appropriate gear ratios could also be used. Integrating a gear system, such as planetary gear system 28, with the drive means assembly 27 permits the drive means and the aircraft drove wheel to run more effectively at higher revolutions per minute (rpm).

The drive means assembly 27 is preferably not drivingly connected to the wheel 10 at all times during operation. To achieve this, a clutch 38 is preferably provided to selectively engage and disengage the gear assembly and, thus, the drive means assembly 27 from the wheel as required. Employing a clutch to disconnect the drive means assembly or motor from the wheel at touchdown would minimize spin-up load. A motor that does not require a clutch could also be installed within the wheel 10 substantially as shown.

The wheel walls 20 and 24 are coupled together in a manner that ensures sufficient axial play so that the bearings 16 and 18 can be preloaded, if desired. Additional bearings 48 and 50 near the axle 32 support the drive assembly 11 on an axle-contacting extension 52 of the inboard wall 20 that may be keyed to the outboard wall 24. Bolts or suitable fasteners, such as bolt 54, are provided to hold the walls together so the entire wheel drive assembly 11 can be removed as a unit. Alternatively, the inboard and outboard walls 20 and 24 could be machined as a single, integral structure rather than the multiple part wheel structure shown.

A torque arm 56 configured to be connected at one end by a bolt 58 or like fastener to the inboard wall 20 provides a mechanical connection between the drive assembly components and a non-rotating landing gear structure to provide for a torque reaction. All torque goes out from the arm 56. A stator support may be grounded back to the torque arm 56, and bolts (not shown) connecting the stator 40 to the inboard wall could also be used as a torque device.

A valve stem 60 is positioned above bearing 18 and the outboard wall 24 to allow easy access to the wheel tire and valve (not shown) to check tire pressure and inflate the tire, when necessary. In contrast to tire flange 12, tire flange 14 is designed to be a demountable flange to provide more space and facilitate tire changes. O-ring grooves 62 are provided adjacent to the demountable flange 14 to accommodate seals (not shown) that effectively seal the wheel drive assembly components and prevent oil or other heat transfer fluid from leaking. The seals also prevent contaminants, such as water, ice, and snow, and highly corrosive materials, such as the deicing chemicals and hydraulic fluids commonly used at airports, from entering the interior of the wheel or contacting wheel drive assembly components.

The heat dissipation system of the present invention is preferably configured to provide heat transfer fluid automatically to assist in transferring heat away from the drive means and other drive assembly components and maintaining thesecomponents at a desired optimum operating temperature. Sensors 70 are preferably provided to sense the temperature of selected drive means assembly 27 components, such as, for example, the drive means stator 40 or rotor 44, and communicates the temperature to a drive means temperature controller 72. When the temperature of the drive means components or other drive assembly components is determined to exceed a predetermined maximum operating temperature, intelligent software provided with the temperature controller 72 automatically activates valves or like structures, such as valves 35 and 39, controlling the flow of fluid into and out of channels 36 and 37 to allow oil or another suitable heat transfer fluid from the reservoir 34 to circulate from the reservoir 34 into and out of the interior of the wheel drive assembly 11. The valves 35 and 39 could be opened one at a time or together to pull oil into the drive assembly 11 by negativepressure. Heat generated by the wheel drive assembly moving components would be transferred to the oil or other heat transfer fluid. Rotation of the rotor 44 and or gear assembly 28, for example, will cause oil to splash onto these and other wheel drive assembly components to dissipate a portion of the heat generated to the oil. Heated oil returns to the reservoir, and the temperature is reduced below a predetermined maximum temperature by the increased thermal distribution mass provided by the reservoir 34 and the heat spread by the reservoir, as well as by the heat transfer fluid contacting the stator 40, rotor 44, gear assembly 28, and/or other wheel drive assembly structures.

In one possible arrangement, a valve 35 for the upper channel 36 would automatically close, and a valve 39 for the lower channel 37 would then automatically open to allow the now heated oil or other heat transfer fluid to flow from the wheel drive assembly 11 back into the reservoir 34, removing heat from the wheel drive assembly 11 and transferring it to the reservoir. Other heat dissipating and increased thermal distribution fluid flow arrangements are also possible and are contemplated to be within the scope of the present invention. Some oil could remain in the wheel drive assembly to also provide lubrication for moving wheel drive assembly components.

Additional heat dissipation is provided by the solid thermal connection between the wheel drive means assembly 11 and the hardware of the axle 30 and piston 22. This solid thermal connection increases mass available for heat transfer and further enables the shedding of heat through those large metallic components. Other arrangements for increasing effective thermal distribution mass and dissipating heat in a drive means-driven aircraft wheel drive assembly could also be used in combination with the present heat dissipating system to enhance thermal distribution and extend drive means operating time and useful life.

Integrating a heat dissipation system and wheel drive assembly within an aircraft nose or main gear wheel as the aircraft is being constructed does not present problems because the space available for landing gear components, including motors and cooling structures, can be adjusted as required. Retrofitting existing aircraft presents challenges, however. Because of the unique configuration of the wheel as described above, the system of the present invention for dissipating heat in a wheel drive assembly overcomes these challenges and provides a drive wheel assembly that can be fitted into the limited space available for aircraft landing gear components without modifying any of the other landing gear components. As a result, an aircraft's existing wheel well, tire, axle, piston, and other landing gear components can continue to be used. It is possible to retrofit existing aircraft simply and effectively with the present heat dissipating system in a wheel drive assembly so that these older aircraft can achieve the operating efficiency and prolonged component life possible with the heat dissipating system of the present invention, as well as the fuel and cost savings and other advantages of autonomous aircraft ground movement.

While the present invention has been described with respect to preferred embodiments, this is not intended to be limiting, and other arrangements and structures that perform the required functions are contemplated to be within the scope of the present invention.

INDUSTRIAL APPLICABILITY

The present invention will find its primary applicability in providing heat dissipation and effective thermal distribution in an onboard non-engine powered drive wheel assembly that powers one or more aircraft wheels to drive the aircraft autonomously on the ground without directly using the aircraft engines. The system may be designed to function automatically to dissipate heat from wheel drive assembly components during aircraft ground travel.

The invention claimed is:

1. A system for dissipating heat in an onboard non-engine powered wheel drive assembly mounted to power one or more aircraft nose or main landing gear wheels to drive the aircraft autonomously on the ground without operation of the aircraft engines, comprising:
   a. one or more aircraft nose or main landing gear drive wheels with
      an onboard non-engine powered wheel drive assembly mounted completely within inboard and outboard walls of said one or more landing gear wheels:
   b. a supply of a heat transfer fluid;
   c. a reservoir containing said supply of the heat transfer fluid made of a material to increase thermal mass of said wheel drive assembly mounted in thermal contact with an inboard or an outboard wall of said one or more landing gear wheels and in heat transfer relationship with said wheel drive assembly; and
   d. a heat transfer fluid communication system fluidically connecting said reservoir to said wheel drive assembly to circulate the heat transfer fluid between said reservoir and components of said wheel drive assembly during operation of said wheel drive assembly, wherein said wheel drive assembly, said reservoir and said heat transfer fluid communication system are mounted substantially completely within a space defined by inboard and outboard boundaries of said one or more nose or main landing gear wheels.

2. The system of claim 1, wherein said wheel drive assembly components comprise
   a. a non-engine drive means for powering said one or more aircraft landing gear wheels,
   b. a gear assembly means for driving said non-engine drive means, and
   c. a clutch drivingly connecting said non-engine drive means and said gear assembly means during operation of said wheel drive assembly.

3. The system of claim 2 wherein said non-engine drive means comprises:
   a stator element, and
   a rotor element,
   wherein said fluid communication system fluidically connects said reservoir to said non-engine drive means to direct said heat transfer fluid from said reservoir to cool or lubricate said stator element and said rotor element.

4. The system of claim 2, wherein said non-engine drive means comprises:
   a motor selected from the group comprising high phase order electric motors, electric induction motors, permanent magnet brushless DC motors, switched reluctance motors, hydraulic pump/motor assemblies, and pneumatic motors.

5. The system of claim 1, wherein said heat transfer fluid comprises a fluid selected to transfer heat from said components of said wheel drive assembly to said reservoir when said wheel drive assembly is in operation to drive an aircraft on the ground.

6. The system of claim 5, wherein said heat transfer fluid comprises oil.

7. The system of claim 1, wherein said reservoir is mounted in thermal contact with an outboard wall of said one or more landing gear wheels.

8. The system of claim 1, wherein said reservoir is mounted in thermal contact with an inboard wall of said one or more landing gear wheels.

9. The system of claim 1, wherein said reservoir comprises:
a refillable or a replaceable reservoir.

10. A method for dissipating heat using the system according to claim 2, comprising the step of:
circulating said supply of heat transfer fluid from said reservoir through said heat transfer fluid communication system to said non-engine drive means and back through said heat transfer fluid system to said reservoir, wherein said supply of heat transfer fluid is caused to circulate by negative pressure within said wheel drive assembly created by operation of said non-engine drive means.

11. The method of claim 10, wherein said fluid is oil or another fluid capable of dissipating heat from and cooling the wheel drive assembly components.

12. A system for dissipating heat in an onboard non-engine powered wheel drive assembly mounted to power one or more aircraft nose or main landing gear wheels to drive the aircraft autonomously on the ground without operation of the aircraft engines, comprising:
a. one or more aircraft nose or main landing gear drive wheels with
an onboard non-engine powered wheel drive assembly mounted completely within inboard and outboard walls of said one or more landing gear wheels;
b. a supply of a heat transfer fluid;
c. a reservoir containing said supply of the heat transfer fluid made of a material to increase thermal mass of said wheel drive assembly mounted in thermal contact with an inboard or an outboard wall of said one or more landing gear wheels and in heat transfer relationship with said wheel drive assembly; and
d. a heat transfer fluid communication system with
a first channel and a second channel fluidically connecting said reservoir to said wheel drive assembly to circulate the heat transfer fluid between said reservoir and components of said wheel drive assembly during operation of said wheel drive assembly,
sensors positioned to determine temperatures of selected components of said wheel drive assembly, and
an intelligent drive means temperature controller,
wherein said first channel and said second channel each comprise:
valves selectively controlled by said intelligent drive means temperature controller to selectively open said first channel and said second channel when a temperature determined by the sensors exceeds a predetermined maximum temperature.

13. A method for automatically dissipating heat using the system according to claim 12, comprising the steps of:
a. establishing a maximum operating temperature for said wheel drive assembly;
b. setting a maximum operating temperature for operation of said wheel drive assembly to drive the aircraft on the ground during a selected ground travel route;
c. activating the wheel drive assembly to drive the aircraft along the selected ground travel route;
d. monitoring at least one temperature of said wheel drive assembly components with the sensors;
e. communicating the at least one monitored temperature to said intelligent drive means temperature controller; and
f. selectively controlling said valves with said intelligent drive means temperature controller in response to the communicated at least one monitored temperature to cause heat transfer fluid to circulate between said reservoir and said wheel drive assembly components when the monitored temperature exceeds the set maximum operating temperature, thereby transferring heat from said wheel drive assembly components to said reservoir to maintain said wheel drive assembly components at a temperature below said set maximum operating temperature during travel of said aircraft along said selected ground travel route.

14. The method of claim 13, wherein said fluid is oil or another fluid capable of dissipating heat from and cooling the wheel drive assembly components to a temperature below said set maximum operating temperature.

* * * * *